(12) United States Patent
Tao et al.

(10) Patent No.: US 8,914,186 B2
(45) Date of Patent: Dec. 16, 2014

(54) DUAL-CLUTCH TRANSMISSION THERMAL MANAGEMENT

(75) Inventors: Xuefeng Tim Tao, Northville, MI (US); John William Boughner, Howell, MI (US); Alfonso G. Hysko, Belleville, MI (US); Jonathan P. Kish, Royal Oak, MI (US); Matthew D. Whitton, Howell, MI (US); Fei An, Northville, MI (US); Steven P. Moorman, Dexter, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/452,110

(22) Filed: Apr. 20, 2012

(65) Prior Publication Data

US 2013/0282243 A1   Oct. 24, 2013

(51) Int. Cl.
*G06F 7/00* (2006.01)
*G06F 19/00* (2011.01)
*G01M 17/00* (2006.01)
*G06F 11/00* (2006.01)

(52) U.S. Cl.
USPC .......... 701/29.2; 701/33.4; 701/33.9; 701/60; 701/67

(58) Field of Classification Search
CPC .......... F16D 2500/30405; F16D 13/72; F16D 2300/02; F16D 2300/18; F16D 2500/7101; F16D 2500/30406; F16D 2500/3166; F16D 2500/5106; B60W 10/02; B60W 30/186; B60W 2510/0291

USPC ............................ 701/29.2, 33.4, 33.9, 60, 67
See application file for complete search history.

(56) References Cited

U.S. PATENT DOCUMENTS

| | | | |
|---|---|---|---|
| 4,651,142 A * | 3/1987 | Klatt | 340/453 |
| 2010/0113216 A1* | 5/2010 | Avny et al. | 477/76 |
| 2010/0125399 A1* | 5/2010 | Grolle | 701/96 |
| 2010/0200357 A1* | 8/2010 | Okabe et al. | 192/30 W |
| 2011/0024258 A1* | 2/2011 | Avny et al. | 192/111.12 |
| 2011/0154945 A1* | 6/2011 | Mohlin et al. | 74/665 D |
| 2012/0123635 A1* | 5/2012 | Brevick et al. | 701/36 |
| 2012/0290249 A1* | 11/2012 | Hebbale et al. | 702/130 |
| 2012/0324873 A1* | 12/2012 | Pekarsky et al. | 60/327 |

FOREIGN PATENT DOCUMENTS

EP        1447583  A1 *  8/2004
WO   WO 2011093787  A1 *  8/2011

* cited by examiner

*Primary Examiner* — Calvin Cheung
*Assistant Examiner* — Thomas Ingram
(74) *Attorney, Agent, or Firm* — Quinn Law Group, PLLC

(57) ABSTRACT

A method of controlling thermal loading in a multi-speed dual-clutch transmission (DCT) that is paired with an internal combustion engine in a vehicle is provided. The method includes detecting operation of the vehicle and ascertaining a degree of thermal loading on the DCT. The method also includes selecting a remedial action corresponding to the ascertained degree of thermal loading. Additionally, the method includes activating the selected remedial action such that the thermal loading on the DCT is reduced. A vehicle having a DCT, an internal combustion engine, and a controller configured to control thermal loading in the DCT is also disclosed.

11 Claims, 3 Drawing Sheets

US 8,914,186 B2

DUAL-CLUTCH TRANSMISSION THERMAL MANAGEMENT

TECHNICAL FIELD

The disclosure relates to a system and method for management of thermal loads in a multi-speed, dual-clutch transmission.

BACKGROUND

Modern vehicles are frequently equipped with multi-speed, dual-clutch transmissions (DCT) as part of the subject vehicle's powertrain. Such DCTs are favored for their increased mechanical efficiency in comparison with typical, torque-converter equipped automatic transmissions. Additionally, multi-speed, dual-clutch transmissions are often preferred over typical automated manual transmissions for the DCT's capability to provide higher quality gear shifts.

A typical DCT employs two friction clutches for shifting among its forward ratios, and accomplishes such shifts by alternating engagement between one and the other of the two friction clutches. Such a multi-speed, dual-clutch transmission may be utilized in a hybrid vehicle, i.e., a vehicle employing two or more distinct power sources, such as an engine and an electric motor, for transmitting propulsion energy to subject vehicle's driven wheels.

During operation of a vehicle, significant amount of heat or thermal loads may be generated by and transferred to various subsystems of the powertrain, including the employed DCT. When such thermal loads exceed specific thresholds, performance and reliability of the DCT, as well as general performance of the vehicle, may be adversely affected.

SUMMARY

A method is disclosed for controlling thermal loading in a multi-speed dual-clutch transmission (DCT) that is paired with an internal combustion engine in a vehicle. The method includes detecting operation of the vehicle and ascertaining a degree of thermal loading on the DCT. The method also includes selecting a remedial action corresponding to the ascertained degree of thermal loading. Additionally, the method includes activating the selected remedial action such that the thermal loading on the DCT is reduced.

The method may also include identifying a thermal severity level assigned to the ascertained degree of thermal loading. The act of identifying the thermal severity level may include selecting one of three distinct severity levels. Activating the remedial action is based on the identified severity level.

According to the method, each of the acts of detecting operation of the vehicle, detecting the degree of thermal loading, identifying the severity level, selecting the remedial action, and activating the selected remedial action may be accomplished via a controller.

The act of detecting the degree of thermal loading may include identifying a subsystem of the DCT that is impacted by the thermal loading. The act of identifying the subsystem of the DCT that is impacted by the thermal loading may include distinguishing between a controls subsystem and a clutch subsystem. In such a case, the control subsystem may include a power module, a fluid pump, and a control fluid such as pentosin. Additionally, the fluid pump may be electrically driven. Furthermore, the clutch subsystem may include an odd-ratio clutch and an even-ratio clutch.

According to the method, the act of selecting the remedial action may be accomplished from a list of available remedial actions. Furthermore, the subject remedial action may be activated such that the action has the lowest impact on the performance of the vehicle as compared with the other available remedial actions.

A vehicle having a DCT, an internal combustion engine, and a controller configured to control thermal loading in the DCT is also disclosed.

The vehicle may additionally include a plurality of sensors. In such a case, each sensor may be configured to detect the thermal loading on the power module, the fluid pump, the control fluid, and the odd-ratio and even-ratio clutches.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

A dynamically-shiftable multi-speed dual-clutch transmission (DCT) may be employed as part of a powertrain for a vehicle in order to further enhance the vehicle's efficient use of non-renewable sources of energy, such as fossil fuels. Such a DCT may be provided for a vehicle having a conventional powertrain employing solely a single internal combustion engine for powering the vehicle, or a hybrid type of a powertrain, wherein the vehicle may be powered by an engine, an electric motor, or a combination of the two.

As used herein, the term "dynamically-shiftable" relates to employing a combination of two friction clutches and several dog clutch/synchronizers to achieve "power-on" or dynamic shifts by alternating between engagement of one friction clutch and the other. Additionally, "dynamic shifting" means that drive torque is present in the transmission when a clutched shift to an oncoming speed ratio is made. Generally, the synchronizers are physically "pre-selected" for the oncoming ratio prior to actually making the dynamic shift. As will be readily understood by those skilled in the art, prior to making a "dynamic shift", synchronizers are "pre-selected" to the necessary positions of both the oncoming and off-going ratios prior to actually shifting the torque path from one clutch to the other. The pre-select condition is postponed as long as possible to minimize spin losses because pre-selecting the next ratio forces a speed difference in the open, i.e., not engaged, clutch. This particular gear arrangement allows the combination of torque-transmitting mechanisms for any ratio and its neighboring ratio (i.e., ratio N and ratio N+1) without obtaining a mechanical tie-up in the transmission.

Figure 1:
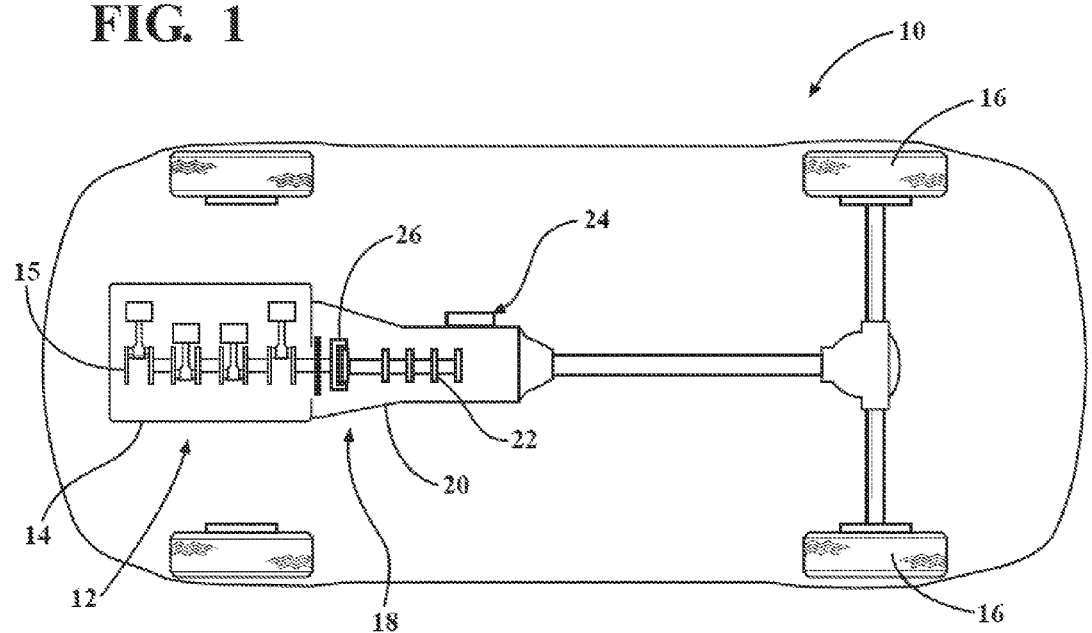
FIG. 1 is a schematic representation of a vehicle powertrain having an internal combustion engine and a dynamically-shiftable, dual-clutch transmission (DCT).
Figure 2:
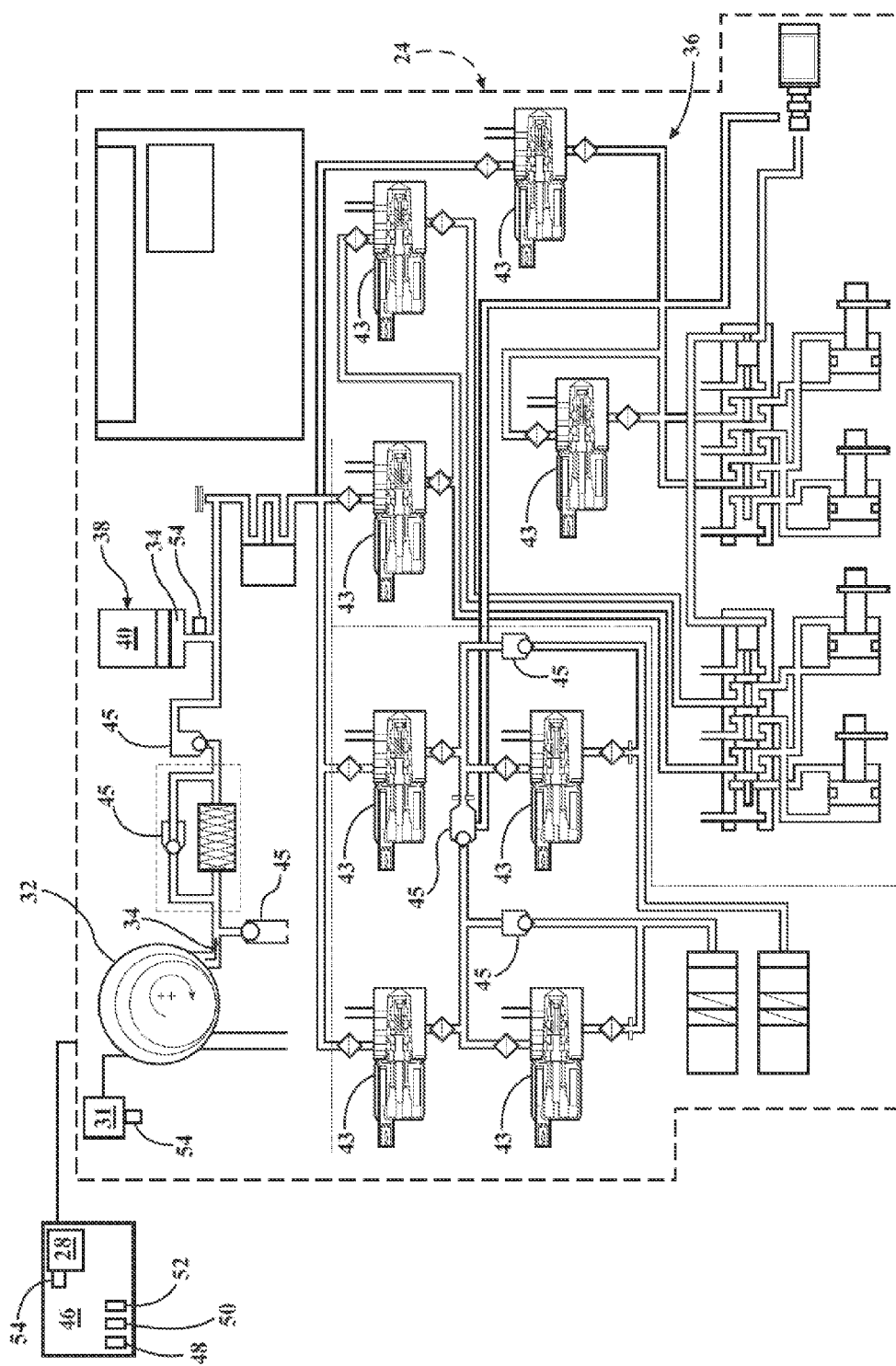
FIG. 2 is a schematic representation of a controls subsystem of the DCT shown in FIG. 1.

Referring to FIGS. 1-2, a vehicle 10 having a powertrain 12 is depicted. The powertrain 12 includes an internal combustion engine 14 configured to generate torque, drive wheels 16 configured to interface with a road surface, and a DCT 18 operatively connected to the engine 14 and configured to transmit engine torque to the drive wheels. Although not specifically shown, as noted above, the powertrain 12 may be configured as a hybrid type and additionally include an electric motor.

The engine 14 utilizes a crankshaft 15 for converting reciprocal motion into rotational motion, as is understood by those skilled in the art. The DCT 18 is paired with the engine 14 at an engine-transmission interface using any appropriate means, including fasteners (not shown) such as threaded screws and dowels. The DCT 18 includes a transmission case 20 for housing a geartrain 22 that is configured to provide a predetermined number of selectable gear ratios for connecting the engine crankshaft 15 to the drive wheels 16. As shown in FIG. 2, the DCT 18 also includes a controls subsystem 24 and, as shown in FIG. 3, the DCT 18 additionally includes a clutch subsystem 26.

With sole reference to FIG. 2, the controls subsystem 24 includes an electric drive system or power module or inverter 28 that is configured to convert DC current of an on-board energy storage device (not shown), such as a battery, into AC current for powering a three-phase electric motor 31. The motor 31 is used to drive a pump 32. Additionally, motor 31 may be incorporated into the pump 32 and be packaged as an integrated electric pump. Although the pump 32 is shown herein as being electrically driven, nothing precludes employing a mechanically driven pump, i.e., by the engine 14, in its place. The controls subsystem 24 also includes a body of control fluid 34, such as pentosin, that resides in a transmission valvebody 36 and is regulated via a system of valves. The controls subsystem 24 additionally includes an accumulator 38. The accumulator 38 is pre-filled with nitrogen gas 40 that effectively serves as an accumulator spring. The pump 32 is a fixed-displacement unit configured to supply a volume of control fluid 34 to the accumulator 38. The supplied pressurized control fluid 34 compresses the nitrogen gas 40 inside the accumulator 38 and is retained by the accumulator for subsequent release to the valvebody 36.

Figure 3:
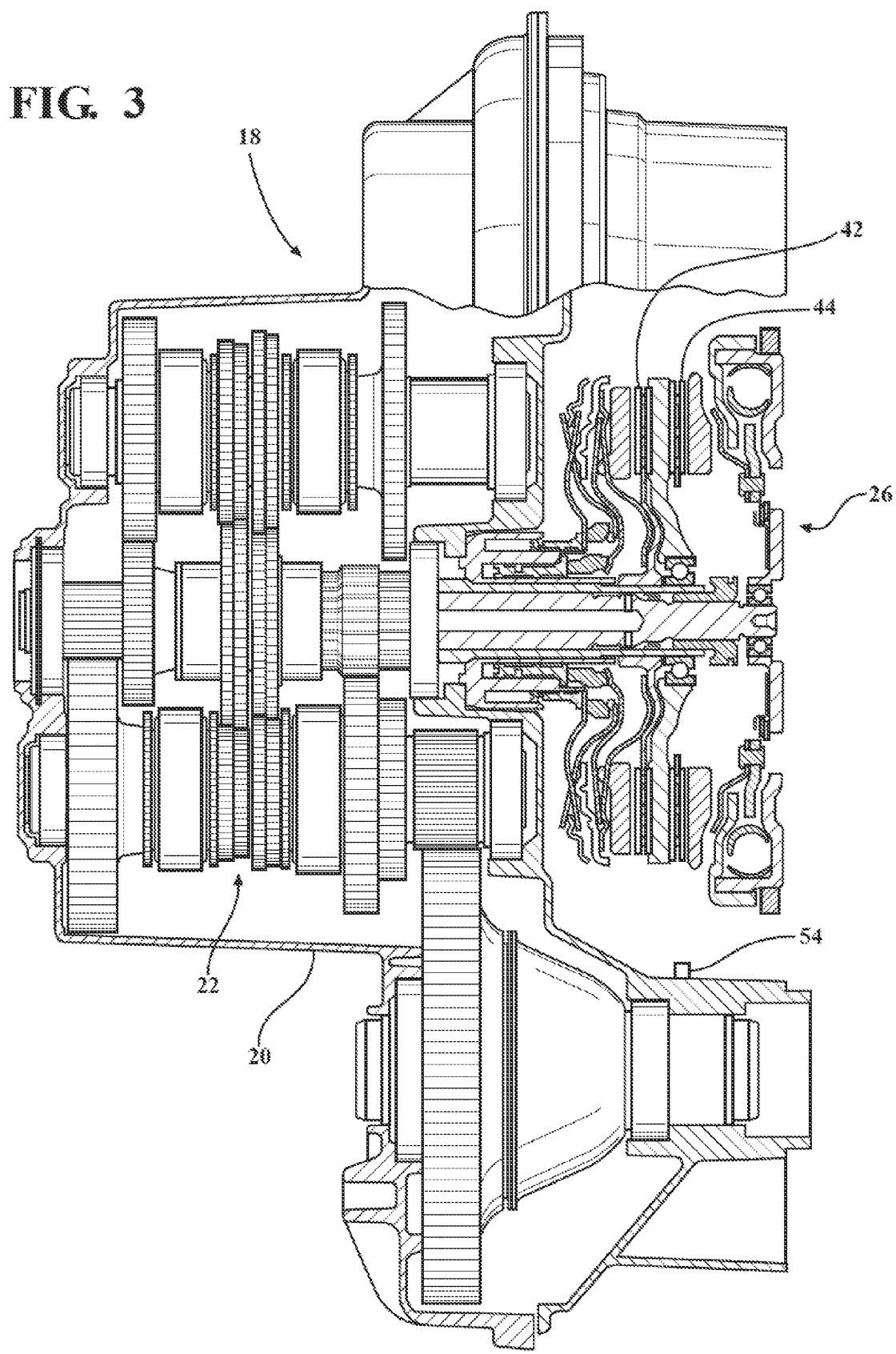
FIG. 3 is a schematic representation of a cross-sectional view of the DCT shown in FIG. 1, specifically illustrating a clutch subsystem.

As shown in FIG. 3, the clutch subsystem 26 includes two dry clutches 42 and 44. As shown, the clutch 42 is an even-ratio clutch, and the clutch 44 is an odd-ratio clutch. The clutches 42, 44 are configured to select the particular drive gear ratio in the DCT 18. During operation of the DCT 18, when one of the clutches 42, 44 is transmitting engine torque in any particular ratio, the other of the two clutches pre-selects an appropriate synchronizer of the oncoming ratio. The valvebody 36 controls selective engagement of the clutches 42, 44 by directing the control fluid 34 to various solenoids 43 and checkvalves 45, that in turn regulate the flow of control fluid between the pump 32, the accumulator 38, and the appropriate clutch.

During operation of the vehicle 10, when the DCT 18 is transmitting engine torque, thermal loading on the controls subsystem 24 and the clutch subsystem 26 may become excessive, i.e., the subsystems may experience excessive temperature or an over-heat condition. Consequently, if not addressed, such excessive thermal loading may lead to damage of the controls and clutch subsystems 24, 26. What constitutes excessive thermal loading with respect to each component or subsystem may be identified specifically for each respective component and/or subsystem based on operating requirements and durability limits thereof.

The vehicle 10 also includes a controller 46 that may be a dedicated transmission controller configured to regulate operation of the DCT 18, or an integrated powertrain controller configured to regulate operation of the entire powertrain 12. The controller 46 is also configured to ascertain a degree of thermal loading on the DCT 18 and determine a remedial action corresponding to the ascertained degree of thermal loading on the DCT 18. Additionally, the controller 46 is configured to activate the remedial action such that the thermal loading on the controls subsystem 24 and the clutch subsystem 26 is reduced.

The controller 46 is additionally configured to identify a thermal severity level assigned to the ascertained degree of thermal loading, i.e., whether the thermal loading is excessive and how severe the over-heat condition is. The controller 46 may be programmed with a plurality of distinct thermal severity levels. In the particular embodiment described herein, the controller 46 is configured to identify between one of three distinct severity levels 48, 50, and 52, wherein level 48 is the lowest, level 50 is the intermediate, and level 52 is the highest thermal severity level. Furthermore, the controller 46 is configured to distinguish between the controls and clutch subsystems 24, 26 with respect to the ascertained thermal loading, in other words to identify whether one or both of the controls and clutch subsystems is impacted by the over-heat condition. The controller 46 is additionally configured to select an appropriate remedial action from a programmed list of available remedial actions. Furthermore, the controller 46 is programmed to select the remedial action that has the lowest impact on the overall performance of the vehicle 10 for a specific thermal severity level 48, 50, or 52, as compared with the predetermined impact of the other available remedial actions. In other words, the controller 46 is configured to prioritize the available remedial actions with respect to their impact on the vehicle's performance for activation of specific remedial action(s) at each specific thermal severity level. Typically, the available remedial actions and their relative effect on the performance of the vehicle 10 and the DCT 18 may be predetermined during development and testing of the vehicle 10. Furthermore, the impact of each remedial action may also be gaged relative to the performance requested by the operator at various operating conditions of the vehicle 10. The vehicle 10 additionally includes a plurality of sensors 54. Each respective sensor 54 is configured to detect the thermal loading on the power module 28, the motor 31, the control fluid 34, and the clutches 42, 44. In lieu of employing sensors 54, the respective temperatures may also be estimated via an algorithm programmed into the controller 46. Thus detected thermal loading is subsequently communicated to the controller 46, and is then evaluated by the controller for selection of an appropriate remedial action.

The available remedial actions that may be programmed into the controller 46 to manage excessive thermal load conditions at the level of the DCT 18, the powertrain 12, and the vehicle 10 are listed below. Notably, the listed remedial actions are labeled consecutively in alphabetical order, for identification purposes only, rather than with regard to any particular significance. One remedial action, herein referred to as remedial action (a), may include activation of a hot mode shift pattern. The remedial action (a) is intended to eliminate selection of certain gear ratios for the purpose of reduced frequency of gear shifting and/or minimized leakage of the control fluid 34, and to foster more rapid cooling of clutches 42, 44. The hot shift mode may also include delaying upshifts in order to permit additional cooling of the clutches 42, 44.

Another remedial action, herein referred to as remedial action (b), may include disabling selection of certain predetermined gear ratios to permit an over-heated one of the clutches 42, 44 to cool prior to being asked to handle additional stress. Disabling of specific gear ratios under the remedial action (b) may be accomplished with regard to minimizing spin losses or gear ratio spread, and be subject to prevention of engine overspeed. Such disabling of a specific gear ratio has the effect of permitting the clutch that is otherwise employed in the subject gear ratio an opportunity to cool off. Another remedial action may include disabling a launch of the vehicle 10 with both clutches 42 and 44, and launching the vehicle with only one of the two clutches. The preceding remedial action is referred to as remedial action (c). Accordingly, the remedial action (c) would permit a single clutch launch, limit heat generation to only one of the two clutches 42, 44, and allow the other of the two clutches, i.e., the clutch that has absorbed a higher thermal load, an additional time to cool prior to being asked to handle additional stress.

An additional remedial action, herein referred to as remedial action (d), may include reduction of frequency of gear shifts in the DCT 18 when frequent changes are requested in acceleration of the vehicle 10 by the vehicle's operator, i.e., by changes in position of the vehicle accelerator pedal. The remedial action (d) would retain response of the DCT 18 to pre-programmed shift requests when the operator of the vehicle 10 requests to maintain constant speed or continuous acceleration from the vehicle, such as by depessing and holding a constant position of the accelerator pedal. Thus, reduced frequency of gear changes in the DCT 18 would serve to decrease the amount of thermal loading seen by the clutches 42, 44, as well as by the electric motor 31 and pump 32. Yet another remedial action, herein referred to as remedial action (e), may include disabling a vehicle creep mode. In a representative vehicle creep mode, a controlled slip may be permitted in one or both of the clutches 42, 44 in order to maintain a particular speed of the vehicle 10, such as during parking lot maneuvers when the vehicle operator does not specifically request vehicle movement. Accordingly, in the remedial action (e) such controlled slip in the clutches 42, 44 would be disabled in order to reduce absorption of additional thermal load by the clutches.

Available remedial actions may include initiating a launch of the vehicle via a rapid engagement of one or both of the clutches 42, 44 to reduce the amount of time that the clutch or clutches being applied slip during the subject launch. For identification purposes, the preceding remedial action is referred to as remedial action (f). Additionally, as part of another remedial action that is referred to herein as remedial action (g), the controller 46 may be programmed to not engage the clutches 42, 44 during launch of the vehicle 10 until a certain predetermined engine speed has been reached, for example 2,000 rpm. The remedial action (g) would minimize feathering or controlled slip in the clutches 42, 44 during launch of the vehicle 10. In other words, as part of the remedial action (g), propulsion of the vehicle 10 in response to the operator's depression of the vehicle's accelerator pedal may be altered in order to reduce the amount of slip in the clutches 42, 44.

An additional remedial action that is referred to as remedial action (h) may be employed to disable pre-selection of one of the clutches 42, 44 during operation of the vehicle 10. At times, pre-selection of gear ratios may be accomplished but the actual ratio is never selected due to a change in operator's intent. Accordingly, disabling the pre-selection of the clutches 42, 44 results in a reduced charge/discharge duty cycle of the accumulator 38. A remedial action (i) may also be employed in which tap-up/tap-down (TUTD) manual shift mode becomes disabled. The remedial action (i) would serve to reduce the number of gear ratio shifts in the DCT 18, and thereby reduce application of additional thermal load in to the clutches 42, 44. Furthermore, a remedial action herein referred to as remedial action (j) may be employed to select an alternative charge schedule for the pump 32. The remedial action (j) is intended to minimize efficiency losses due to operation of the motor 31, the pump 32, and the accumulator 38, as well as reduce temperature increases therein and leakage in the pump and the accumulator.

Fluid charging schedule for the accumulator 38 may be altered as part of a remedial action labeled (k). For example, the remedial action (k) may be commenced to decrease the pressure thresholds at which charging as well as stopping of the charging of the accumulator 38 in order to reduce load on the motor 31 exerted by the pump 32. Additionally, as part of a remedial action labeled (l), the operation of the vehicle 10 may be inhibited or restrained other than in response to extreme vehicle performance requests by the vehicle's operator. An example of such an extreme vehicle performance request may be a request for maximum or near maximum vehicle acceleration, such as via a large or substantially full throttle opening. An operating schedule of a cooling fan (not shown) of the vehicle 10 may also be altered, such as by increasing the fan speed or activating the fan earlier than during regular circumstances, i.e., those pre-programmed into the controller 46, to reduce temperature of the engine coolant, as well as increase the underhood airflow to the DCT 18 and the controller 46. The preceding remedial action is referred to as remedial action (m). As part of the remedial action (m), to additionally aid in reducing temperature of the engine coolant and increasing the underhood airflow, the engine's thermostat (not shown) may be requested to open at a lower temperature.

Additional remedial actions may include limiting torque output of the engine 14 in a particular gear of the DCT 18 such that the clutches 42, 44 may see reduced thermal loading and attendant slip. Such an action may be beneficial when a friction coefficient of one or both of the clutches 42, 44 has degraded due to excessive thermal loads. For identification purposes, the preceding remedial action is referred to as remedial action (n). Operating schedule of hill start assist (HSA) and hill roll-back control (HRC) functions that minimize vehicle roll-back on a grade or incline may be employed more aggressively in a remedial action herein referred to as remedial action (o). Because HSA and HRC functions are enabled by the vehicle's brake control system, when used more aggressively to allow the vehicle roll-back controlled by the brakes rather than by the clutches 42, 44 in the remedial action (o), HSA and HRC function will minimize torque of the clutches during vehicle rollback and reduce generation of heat therein. The remedial action (o) may be taken regardless of the grade that the vehicle 10 is positioned on, and may additionally be coordinated with the remedial action (e).

If the vehicle 10 is equipped with an adjustable grille shutter (not shown), such a shutter may be opened to a greater degree than according to a regularly programmed schedule for a specific vehicle operation in a remedial action herein referred to as remedial action (p). As part of a remedial action referred to as remedial action (q), pulsation in one or both of the clutches 42, 44 may be initiated in order to generate vehicle driveline shudder and thereby notify the vehicle operator that the respective clutch is taking extreme thermal loads. Additionally, a microslip mode, where a particular clutch is permitted to experience periodic short-duration slip, may be disabled in the clutches 42, 44 as part of a remedial action that is referred to as remedial action (r). The foregoing microslip mode is typically employed in the DCT's engaged clutch to absorb driveline vibrations, as well as part of clutch-to-clutch shift control in the off-going clutch at steady state in order to shorten the time necessary for completing a ratio change. The remedial action (r) may be employed to reduce energy consumption by the accumulator 38 and reduce heat generation in the inverter 28, motor 31, and pump 32.

In the situation where the controls subsystem 24 is impacted by excessive thermal loading at the lower thermal severity level 48, the controller 46 may select and activate one or more of the remedial actions (a), (b), (h), (m), (p), (k), (j), (i), and (d). In the present embodiment, no specific remedial actions are identified for the intermediate thermal severity level 50. Accordingly, if the controls subsystem 24 is impacted by excessive thermal loading at the intermediate thermal severity level 50, the controller 46 does not select any additional remedial actions and only retains the remedial actions selected and activated under the thermal severity level 48. Wherein the controls subsystem 24 is impacted by excessive thermal loading at the highest thermal severity level 52, the controller 46 may select and activate one or more of the remedial actions (l) and (n).

In the situation where the clutch subsystem 26 is impacted by excessive thermal loading at the lower thermal severity level 48, the controller 46 may select and activate one or more of the remedial actions (a), (c), and (d). Wherein the clutch subsystem 26 is impacted by excessive thermal loading at the intermediate thermal severity level 50, the controller 46 may select and activate one or more of the remedial actions (e), (o), and (f). Additionally, where the clutch subsystem 26 is impacted by excessive thermal loading at the highest thermal severity level 52, the controller 46 may select and activate one or more of the remedial actions (g), (m), (p), (l), and (n).

In a situation where the thermal severity level increases from level 48, through level 50, and up to level 52 for each of the controls subsystem 24 and the clutch subsystem 26, as additional remedial actions are activated, the remedial actions that have been turned on to counteract the lower severity levels remain effective, as well. Additionally, as described above, for each subsystem 24, 26, the controller 46 is configured to select the remedial action that has the lowest impact on the overall performance of the vehicle 10 as compared with the predetermined impact of the other remedial actions available for each thermal severity level.

The controller 46 may additionally be programmed to track and monitor activation frequency of the highest thermal severity level 52 for each of the power module 28, the fluid pump 32, the control fluid 34, and the clutches 42, 44. In such a case, the controller 46 will effectively function as an over-temperature monitor for the controls subsystem 24 and a clutch subsystem 26 of the DCT 18. Such monitoring of the activation frequency of the highest thermal severity level 52 may be employed for troubleshooting and servicing of the DCT 18. Accordingly, the controller 46 may be programmed to store accumulated time at particular pre-defined temperatures for each of the power module 28, the fluid pump 32, the control fluid 34, and the clutches 42, 44 throughout the service life of the DCT 18. Such management of the thermal loads on the DCT 18 is intended to bring increased durability and extended operating life to the DCT, as well as more effective troubleshooting and servicing of the DCT 18 that may be required as a result of the DCT's operation at elevated temperatures.

Figure 4:
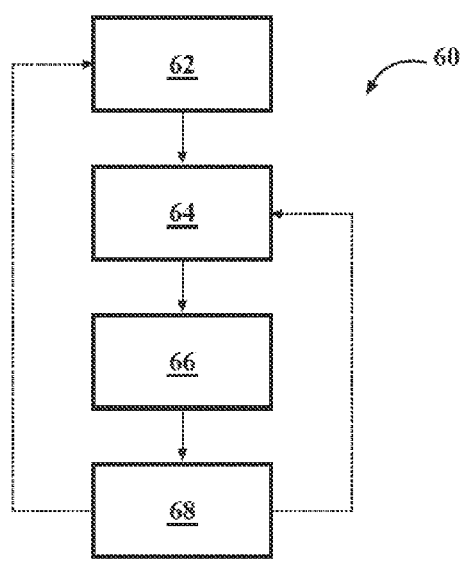
FIG. 4 is a flow chart illustrating a method of controlling thermal loading in the DCT depicted in FIGS. 1-3.

FIG. 4 depicts a method 60 of controlling thermal loading in the DCT 18, as described above with respect to FIGS. 1-3. The method commences in frame 62 with the engine 14 being turned on and detecting operation of the vehicle 10 by the controller 46. From frame 62, the method proceeds to frame 64, where the method includes ascertaining the degree of thermal loading on the DCT 18. Additionally, as part of ascertaining the degree of thermal loading on the DCT 18, the method may include identifying a thermal severity level assigned to the ascertained degree of thermal loading.

As described above with respect to FIGS. 1-3, such identification of the thermal severity level may include selecting one of three distinct severity levels 48, 50, and 52. The foregoing activation of the remedial action from the list of actions (a)-(r) may be based on the identified severity level. The method may also include storing the ascertained degree of thermal loading as well as the identified thermal severity level assigned to the ascertained degree of thermal loading in the controller 46 for subsequent retrieval and analysis. After frame 64, the method advances to frame 66 where the method includes determining a remedial action from a list of available remedial actions that includes actions (a)-(r), and which corresponds to the ascertained degree of thermal loading. The list of available remedial actions including actions (a)-(r) may be pre-programmed into the controller 46 for ready access during operation of the vehicle 10.

As noted above, the thermal loading on the controls subsystem 24 and a clutch subsystem 26 of the DCT 18 may be detected via the plurality of sensors 54. Furthermore, the detected thermal loading is subsequently communicated to the controller 46 for evaluation and selection by the controller of the appropriate remedial action. Each of the sensors 54 may be positioned to detect the degree of thermal loading on the respective components of the controls subsystem 24 and a clutch subsystem 26 of the DCT 18. As described above with respect to FIGS. 1-3, the control subsystem 24 includes the power module 28, the fluid pump 32, the control fluid 34, wherein the clutch subsystem 26 includes the odd- and even-ratio clutches 42, 44. Thus, the described detection of the thermal loading on specific components additionally permits identifying the particular subsystem 24 and/or 26 of the DCT 18 that is impacted by the thermal loading.

From frame 66 the method moves on to frame 68. In frame 68 the method includes activating the determined remedial action such that the thermal loading on the DCT 18 is reduced. Following frame 68, the method 60 may loop back to frame 64 for ascertaining the degree of thermal loading on the DCT 18, or conclude after the vehicle 10 has been shut off and then loop back to frame 62 and re-commence when the vehicle is restarted. The described method is intended to facilitate increased durability and extended operating life for the DCT 18 despite the DCT's operation at elevated temperatures, as well as permit more effective troubleshooting and servicing of the DCT to ensure extended reliable transmission operation.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling thermal loading in a multi-speed dual-clutch transmission (DCT) that is paired with an internal combustion engine in a vehicle, the method comprising:
  detecting via a controller operation of the vehicle;
  ascertaining via the controller a degree of thermal loading on the DCT;
  selecting via the controller a remedial action corresponding to the ascertained degree of thermal loading; and
  activating via the controller the selected remedial action such that the thermal loading on the DCT is reduced;
  wherein said ascertaining the degree of thermal loading includes identifying a subsystem of the DCT that is impacted by the thermal loading by detecting via a plurality of sensors the thermal loading on a controls subsystem and a clutch subsystem of the vehicle; and wherein the controls subsystem includes at least one of a power module, a fluid pump, an accumulator, and a control fluid, and the clutch subsystem includes an odd-ratio clutch and an even-ratio clutch.

2. The method of claim 1, further comprising identifying a thermal severity level assigned to the ascertained degree of thermal loading.

3. The method of claim 2, wherein said identifying the thermal severity level includes selecting one of three distinct severity levels and said activating the remedial action is based on the identified severity level.

4. The method of claim 1, wherein said identifying the subsystem of the DCT that is impacted by the thermal loading includes distinguishing between a controls subsystem and a clutch subsystem.

5. The method of claim 1, wherein the fluid pump is electrically driven.

6. The method of claim 1, wherein said selecting the remedial action is accomplished from a list of available remedial actions such that the activated remedial action has the lowest impact on the performance of the vehicle as compared with the other available remedial actions.

7. A vehicle comprising:
  an internal combustion engine configured to generate engine torque;
  a drive wheel configured to interface with a road surface;
  a multi-speed dual-clutch transmission (DCT) operatively connected to the engine and configured to transmit engine torque to the drive wheel;
  a plurality of sensors; and
  a controller configured to:
    ascertain a degree of thermal loading on the DCT;
    select a remedial action corresponding to the ascertained degree of thermal loading;
    activate the remedial action such that the thermal loading on the DCT is reduced; and
    identify a subsystem of the DCT that is impacted by the thermal loading from a controls subsystem and a clutch subsystem;
  wherein the subsystem that is impacted by the thermal loading is identified by detecting via the plurality of sensors the thermal loading on the controls subsystem and the clutch subsystem; and
  wherein the controls subsystem includes at least one of a power module, a fluid pump, an accumulator, and a control fluid, and the clutch subsystem includes an odd-ratio clutch and an even-ratio clutch.

8. The vehicle of claim 7, wherein the controller is additionally configured to identify a thermal severity level assigned to the ascertained degree of thermal loading.

9. The vehicle of claim 8, wherein the thermal severity level is one of three distinct severity levels and the controller is configured to activate the remedial action based on the identified severity level.

10. The vehicle of claim 7, wherein the fluid pump is electrically driven via a motor.

11. The vehicle of claim 7, wherein the remedial action is selected by the controller from a list of available remedial actions such that the activated remedial action has the lowest impact on the performance of the vehicle as compared with the other available remedial actions.

* * * * *